April 21, 1925.  
F. A. ASSMANN, JR., ET AL  
CAN BODY SOLDERING MACHINE  
Filed Jan. 14, 1922   13 Sheets-Sheet 6
1,534,677
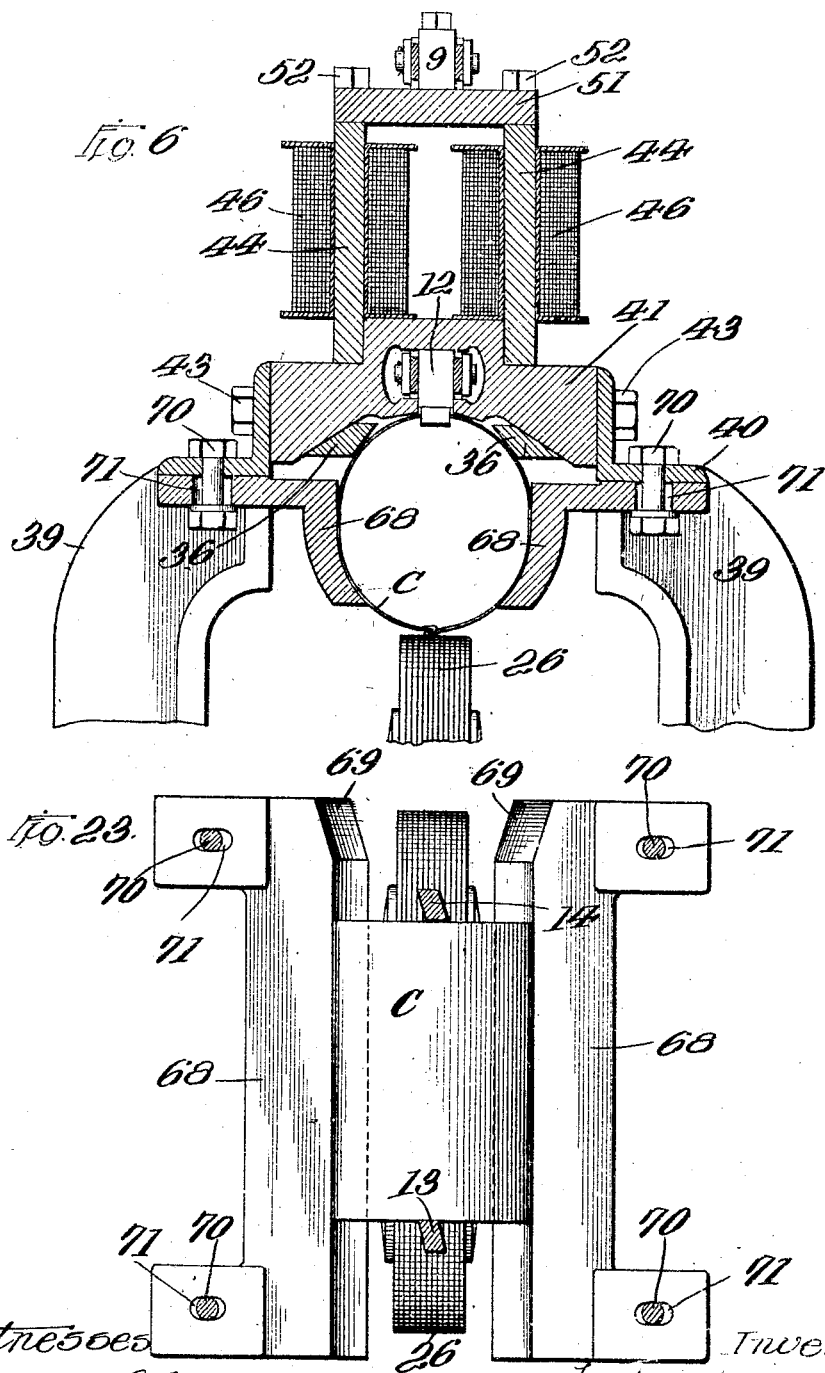

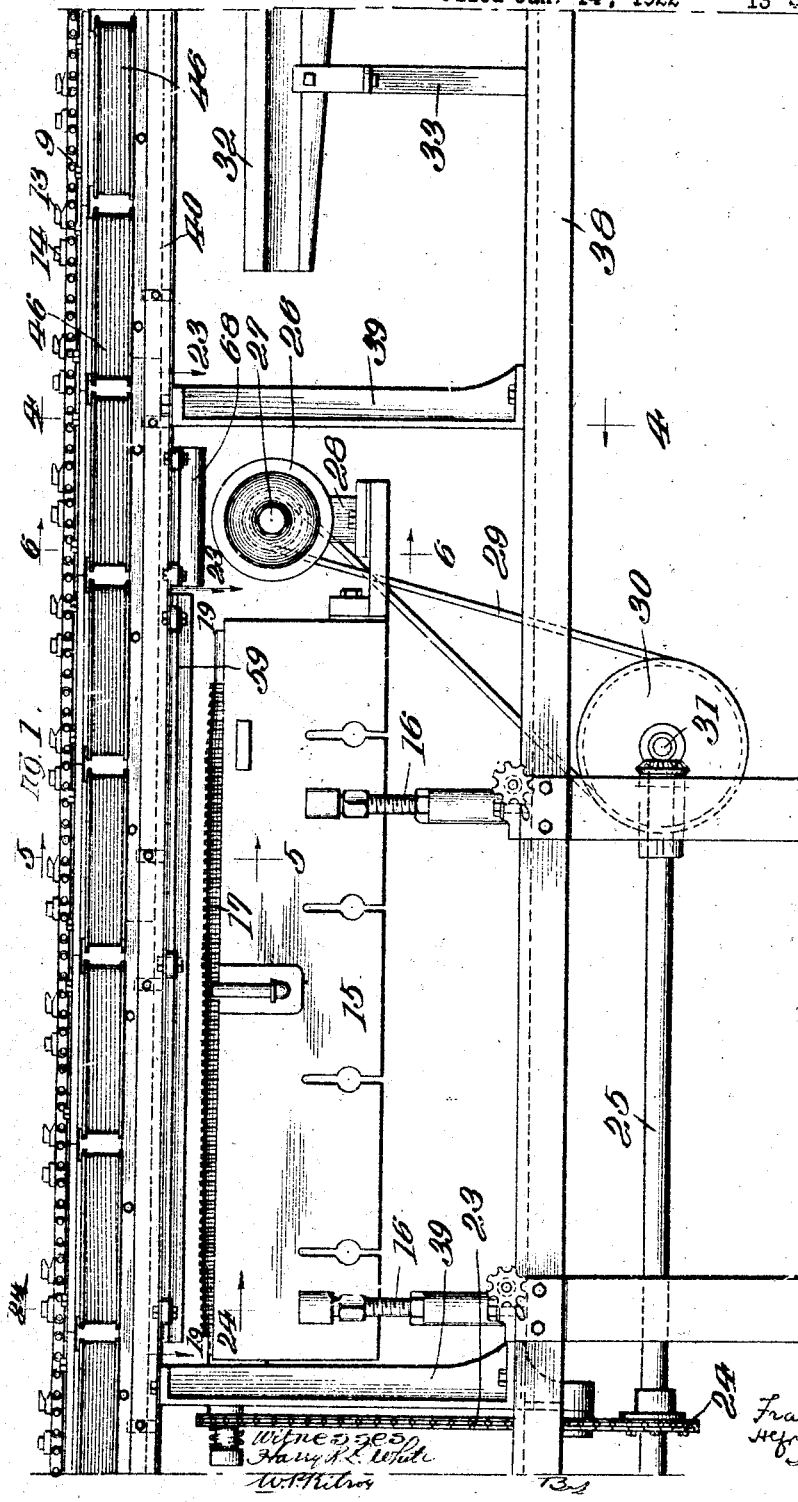

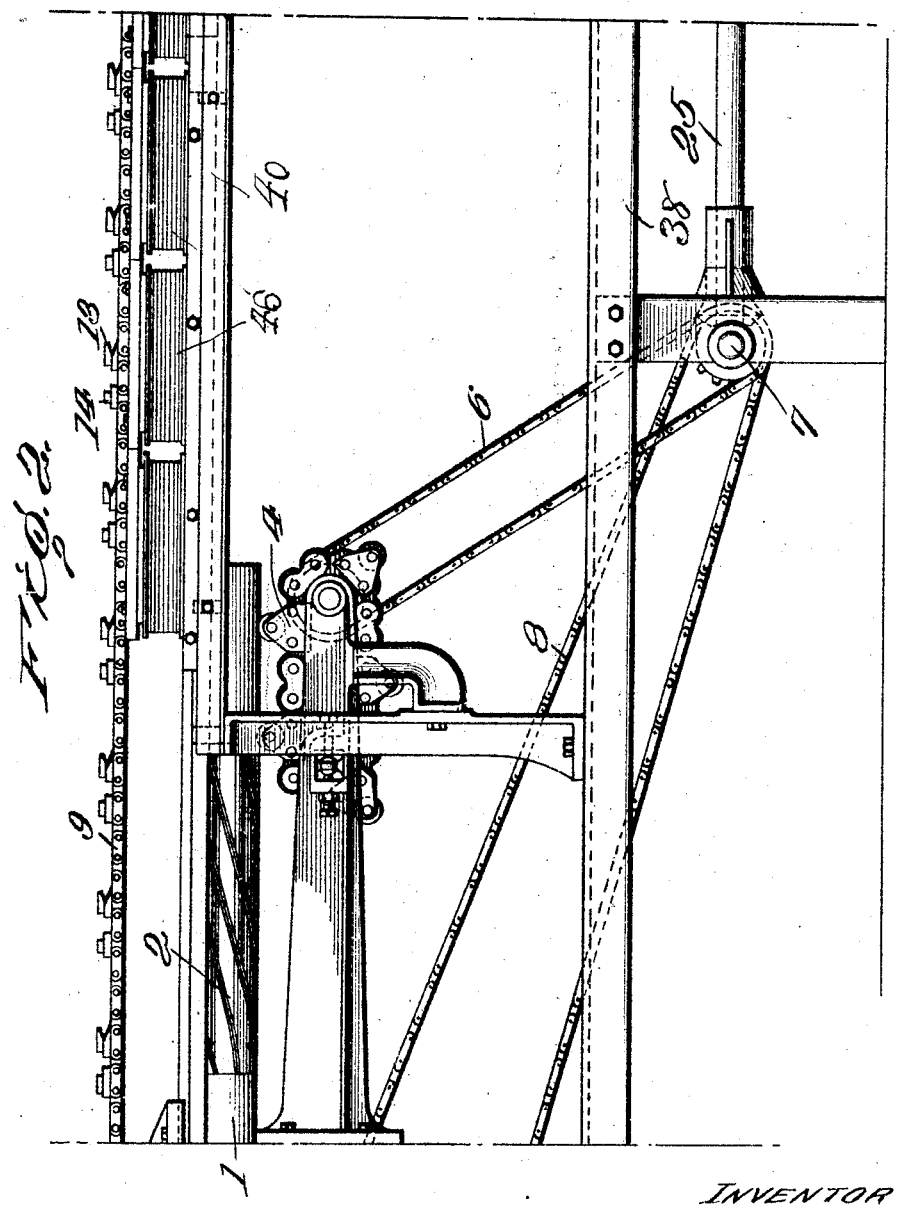

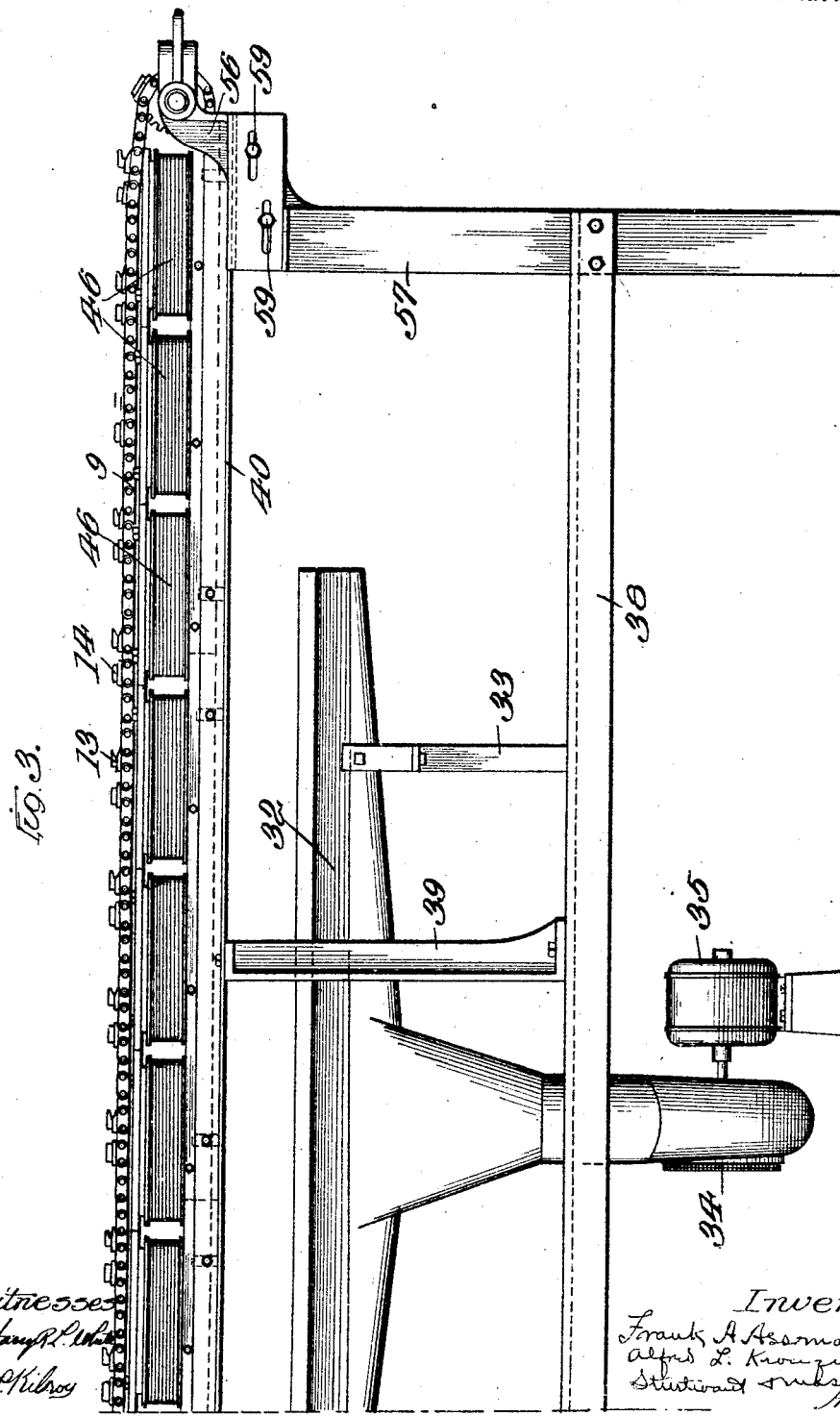

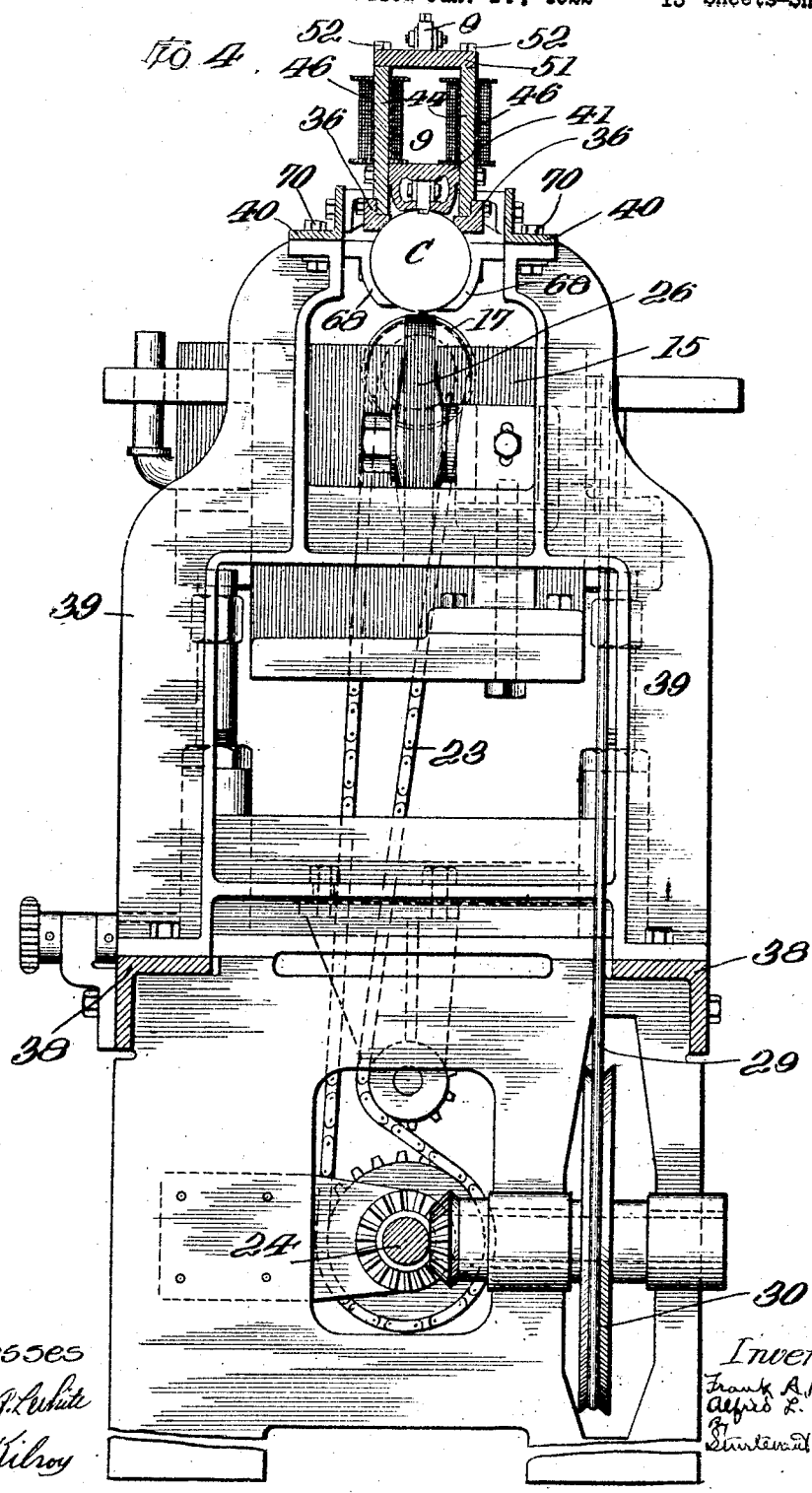

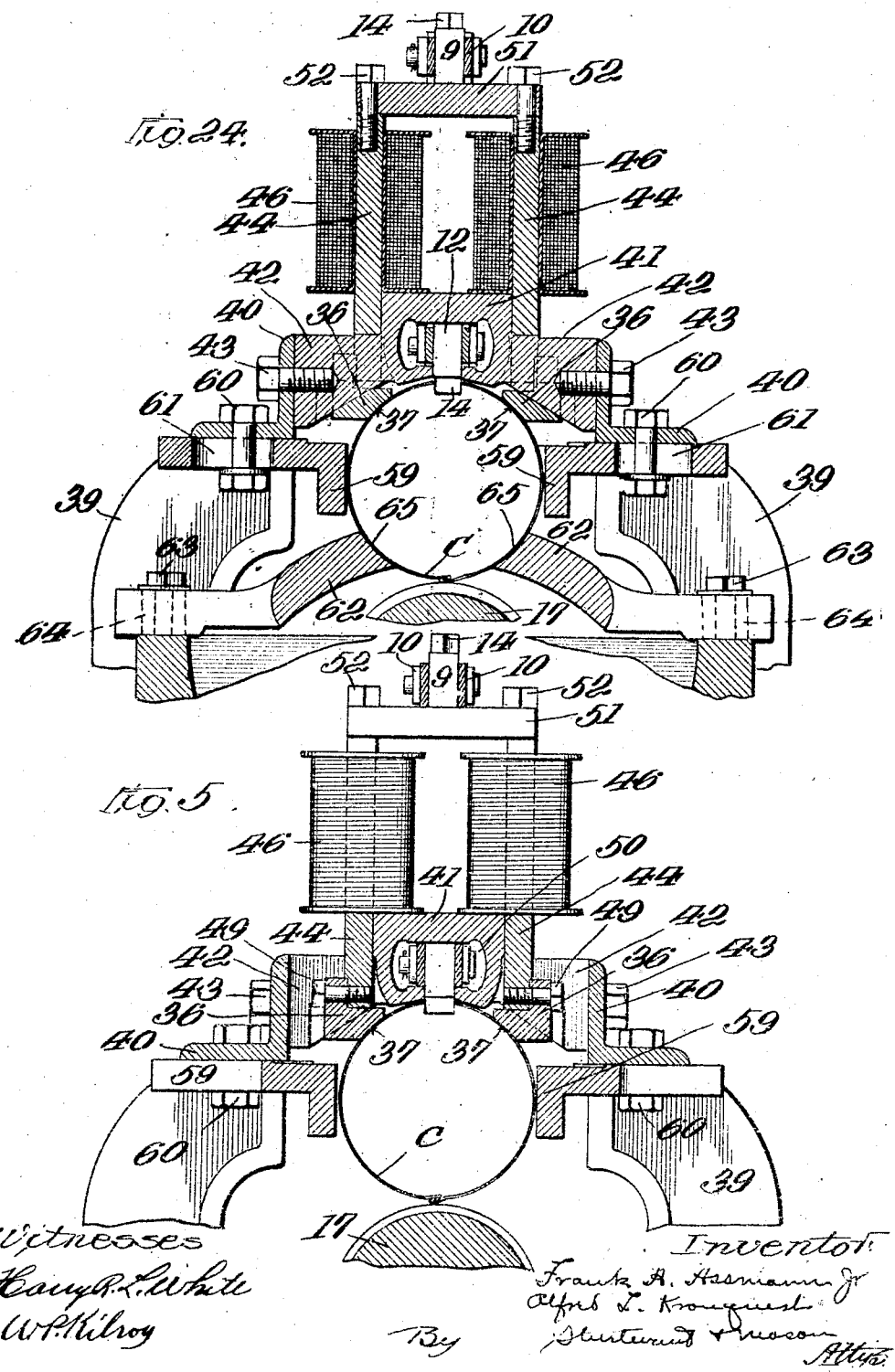

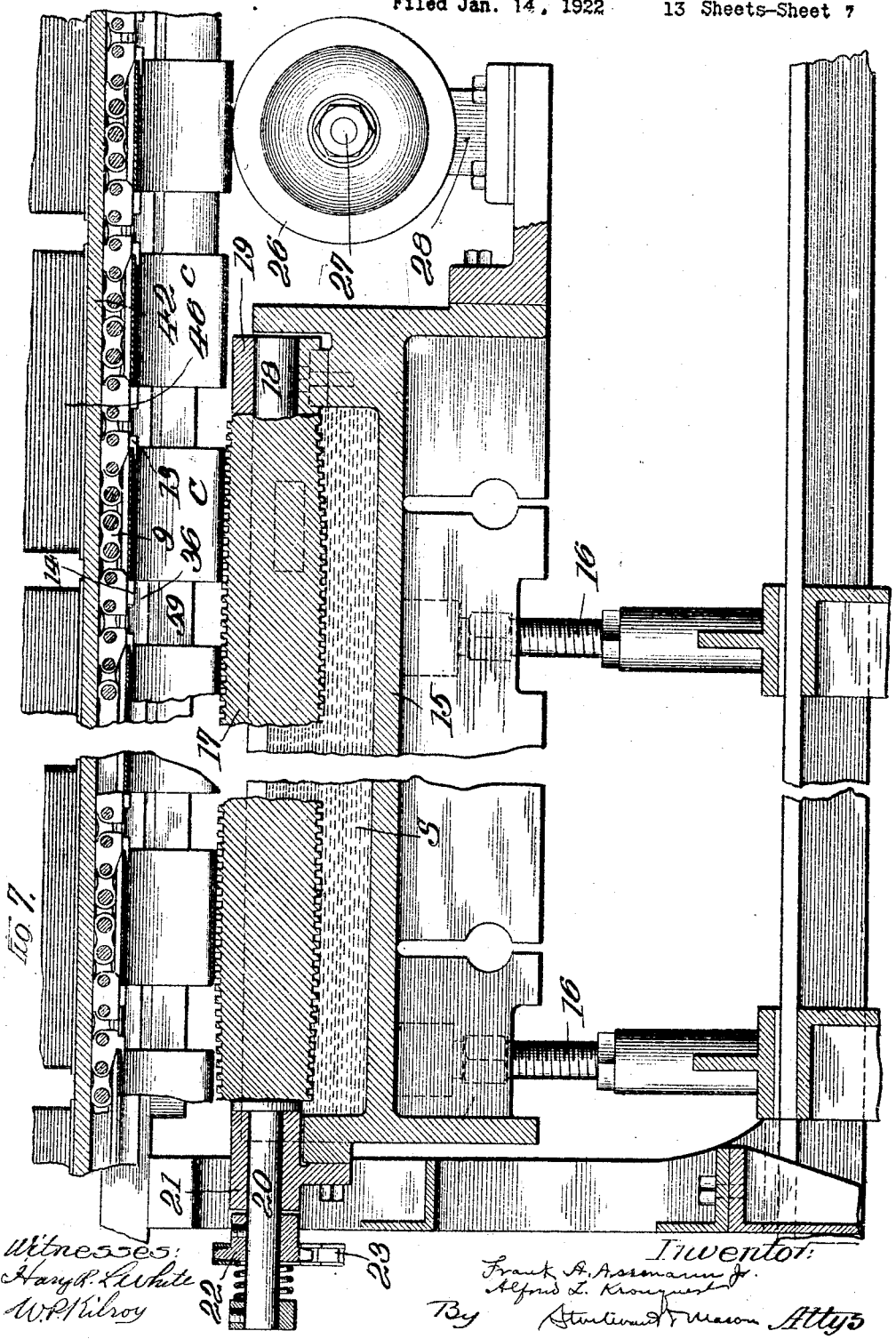

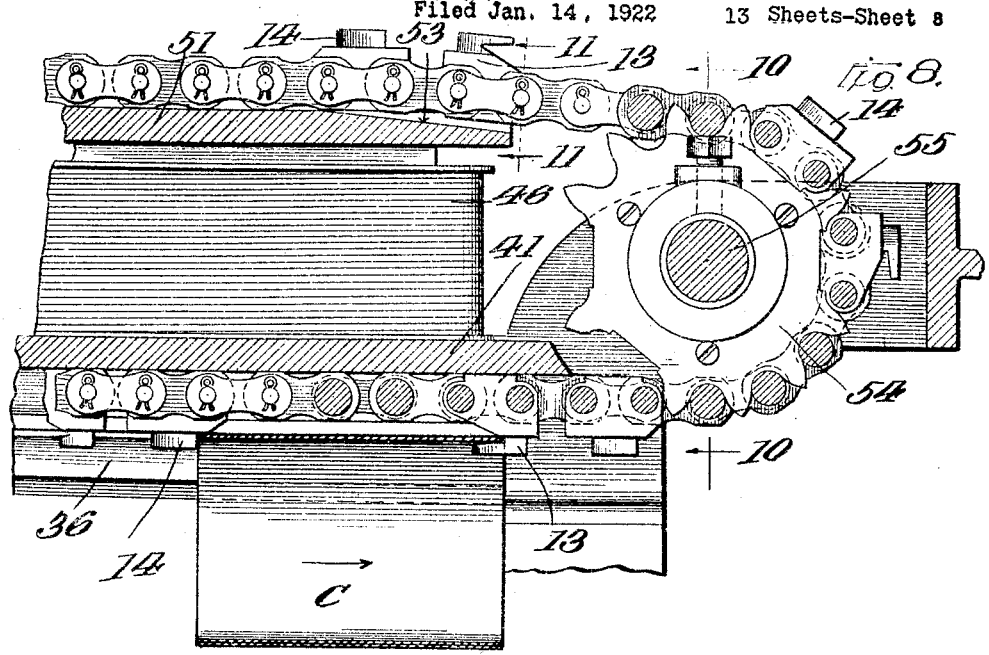
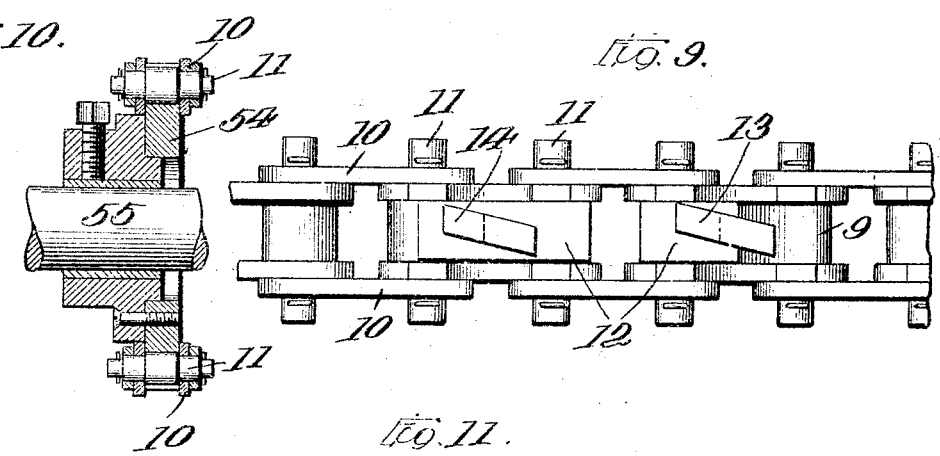
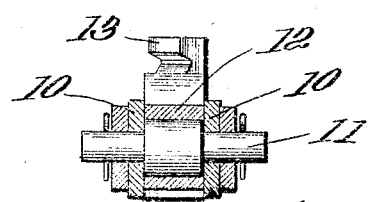

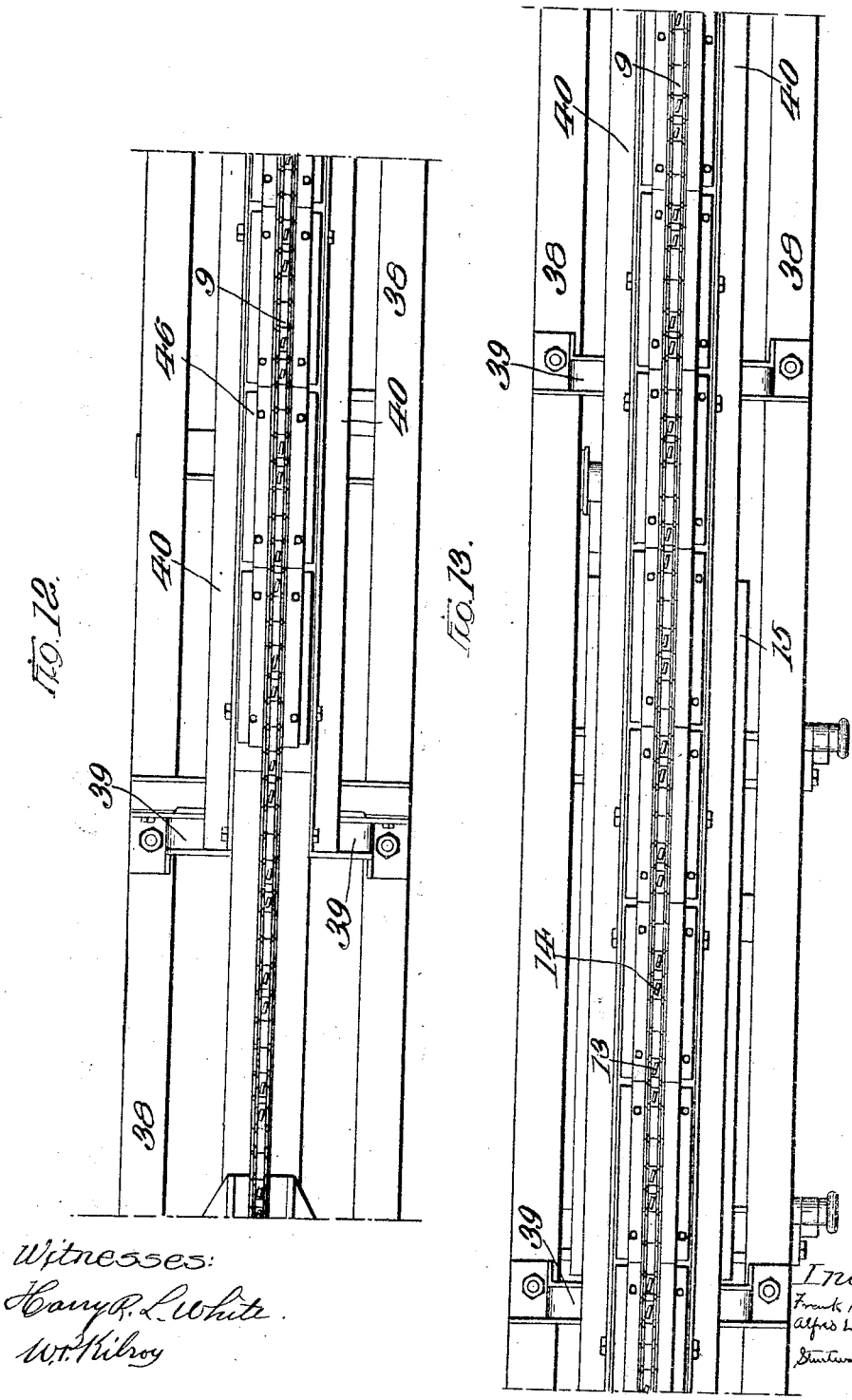

April 21, 1925.
F. A. ASSMANN, JR., ET AL
1,534,677
CAN BODY SOLDERING MACHINE
Filed Jan. 14, 1922    13 Sheets-Sheet 10
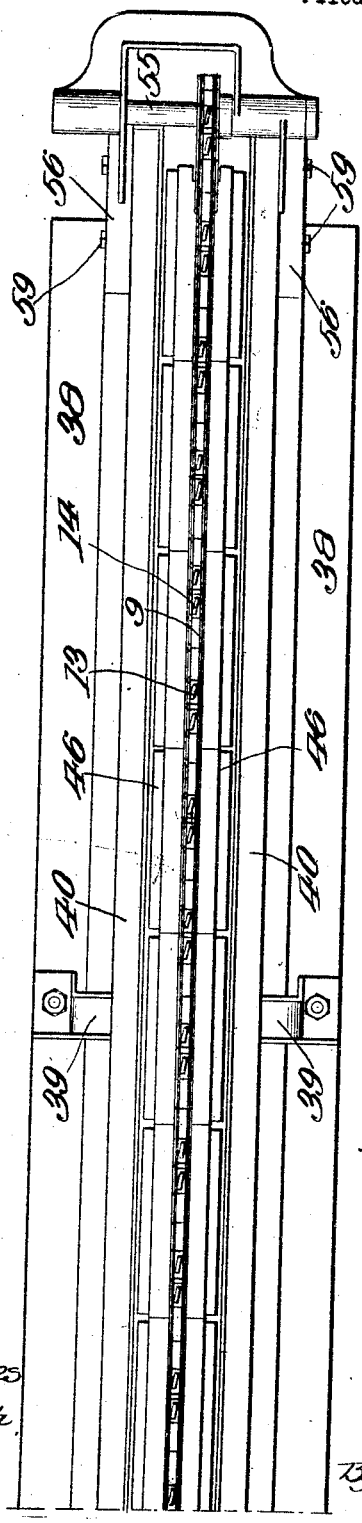
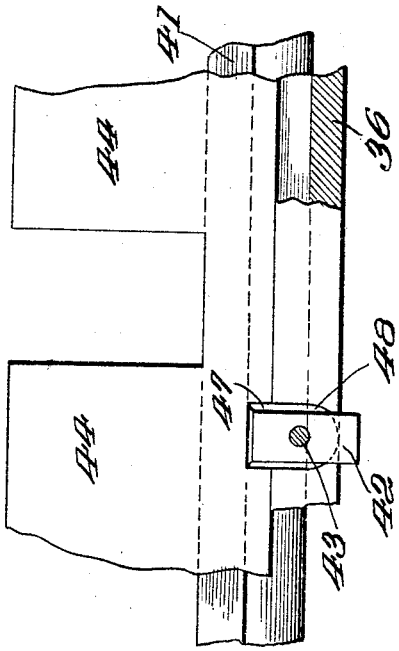
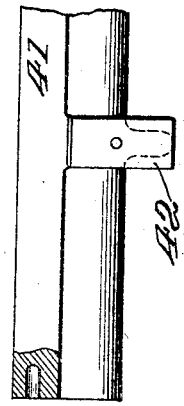

April 21, 1925.                               1,534,677
F. A. ASSMANN, JR., ET AL
CAN BODY SOLDERING MACHINE
Filed Jan. 14, 1922    13 Sheets-Sheet 11
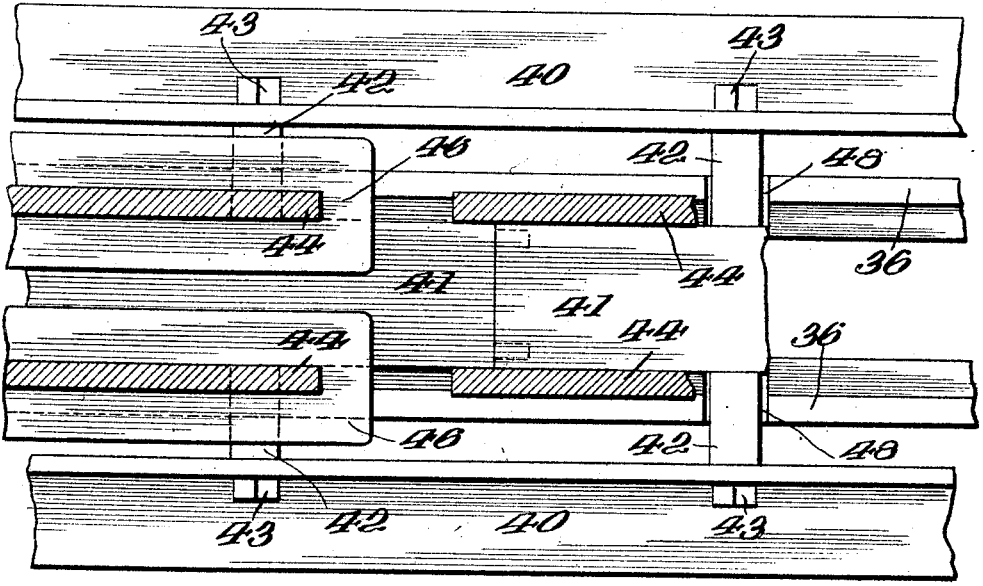
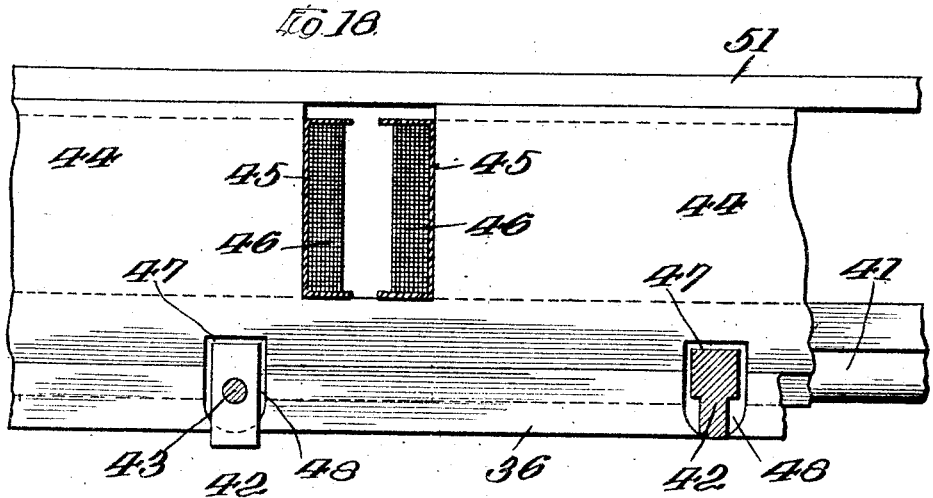

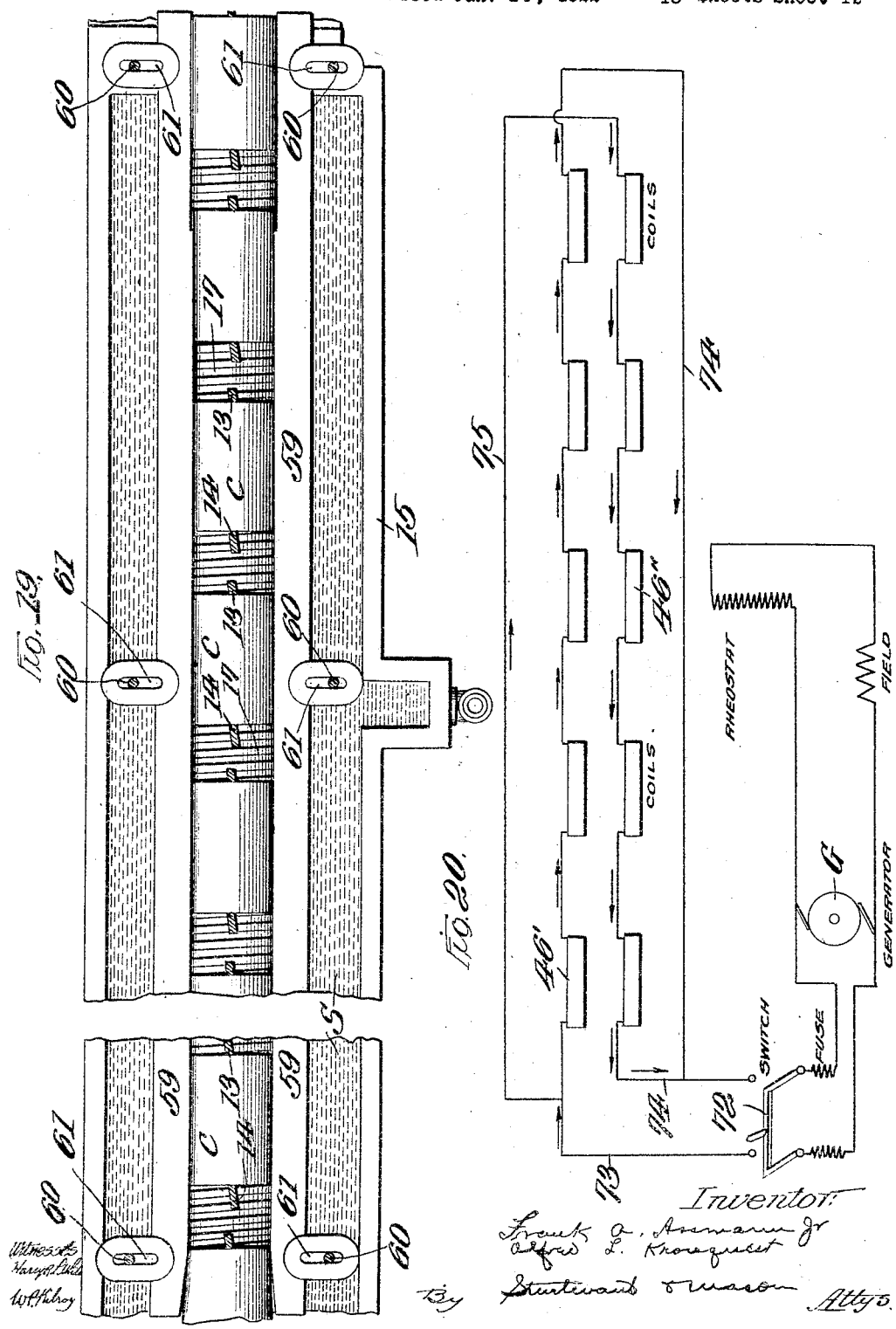

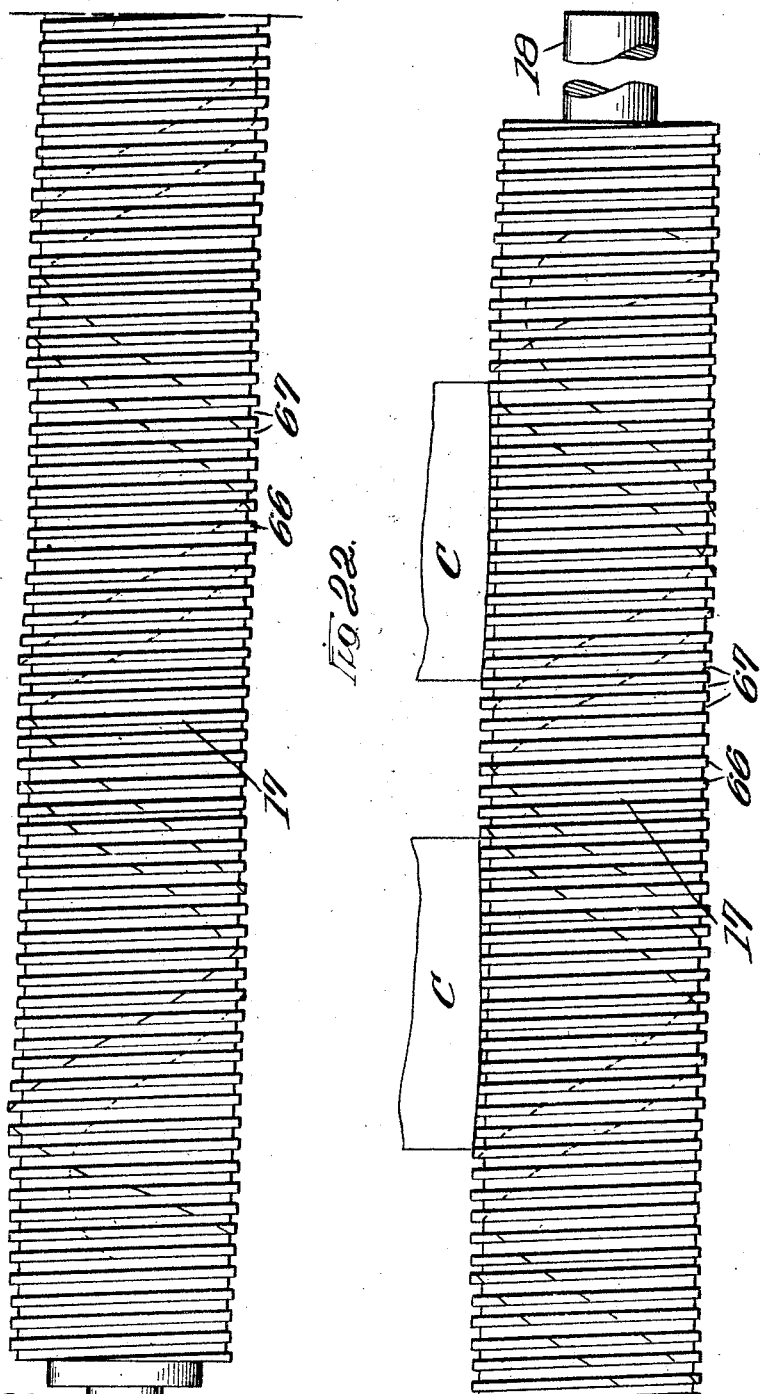

Patented Apr. 21, 1925.

1,534,677

UNITED STATES PATENT OFFICE.

FRANK A. ASSMANN, JR., AND ALFRED L. KRONQUEST, OF CHICAGO, ILLINOIS, ASSIGNORS TO CONTINENTAL CAN COMPANY, OF SYRACUSE, NEW YORK, A CORPORATION OF NEW YORK.

CAN-BODY-SOLDERING MACHINE.

Application filed January 14, 1922. Serial No. 529,147.

*To all whom it may concern:*

Be it known that we, FRANK A. ASSMANN, Jr., and ALFRED L. KRONQUEST, citizens of the United States, residing at Chicago, in the county of Cook, State of Illinois, have invented certain new and useful Improvements in Can-Body-Soldering Machines, of which the following is a description, reference being had to the accompanying drawing, and to the figures of reference marked thereon.

The invention relates to new and useful improvements in can body soldering machines, and more particularly to the means for conveying the can body to a soldering machine for the soldering of the side seam of the can body.

An object of the invention is to provide a conveying means wherein the can body is supported and conveyed along magnetic can body supporting bars.

A further object of the invention is to provide a machine of the above type wherein traveling means is provided for moving the can body along said magnetic bars.

A still further object of the invention is to provide a machine of the above type wherein the traveling means includes a hook-shaped lug for holding the forward traveling end of the can body from displacement from the magnetic supporting bars.

A still further object of the invention is to provide a conveying means wherein the can body is moved along the magnetic supporting bars by means of a pushing lug which is so shaped as to readily permit the removal of the can body from the magnetic supporting bars.

A still further object of the invention is to provide a can body supporting and conveying means which is so constructed that a can body may be readily removed from said conveying and supporting means on its travel from the body forming means to the soldering devices without stopping the machine.

A still further object of the invention is to provide guiding means which cooperates with the conveying and supporting means in the region of the soldering devices for insuring that the side seam will pass the soldering roll at a proper soldering distance therefrom.

These and other objects will in part be obvious and will in part be hereinafter more fully disclosed.

In the drawings which show by way of illustration one embodiment of the invention—

Figure 1 is a side view of a portion of the machine in the region of the soldering means;

Fig. 2 is a side view of a portion of the machine wherein the can body is inverted and through which it is led to the soldering means;

Fig. 3 is a side view showing the extreme rear end of the machine;

Fig. 4 is a sectional view on the line 4—4 of Fig. 1;

Fig. 5 is a sectional view on the line 5—5 of Fig. 1;

Fig. 6 is a sectional view on the line 6—6 of Fig. 1;

Fig. 7 is a transverse sectional view through the solder roll, the solder bath and the conveying and supporting means;

Fig. 8 is a transverse sectional view through the extreme end of the machine showing on an enlarged scale the supporting and conveying means;

Fig. 9 is a top plan view of a portion of the conveying chain;

Fig. 10 is a sectional view on the line 10—10 of Fig. 8;

Fig. 11 is a sectional view on the line 11—11 of Fig. 8;

Fig. 12 is a top plan view of the supporting and conveying means at the extreme left-hand end thereof;

Fig. 13 is a similar view of the central portion thereof;

Fig. 14 is a similar view of the right-hand end portion thereof;

Fig. 15 is a side view of a portion of the non-magnetic supporting and guiding rail for the conveying chain;

Fig. 16 is a view showing partly in side elevation and partly in section the magnetic cores, the magnetic supporting bar, and the non-magnetic chain guiding rail;

Fig. 17 is a view partly in plan and partly in section showing a portion of the non-magnetic cores, the coils, the non-magnetic guiding rail, the magnetic supporting bars, and a portion of the supporting frame for said bars;

Fig. 18 is a side view of the same;

Fig. 19 is a sectional view on the line 19—19 of Fig. 1;

Fig. 20 is a diagrammatic view showing the wiring connection for the coils;

Fig. 21 is a section of the soldering roll;

Fig. 22 is also a section of the soldering roll; but showing the can bodies traveling along the same;

Fig. 23 is a sectional view along the line 23—23 of Fig. 1; and

Fig. 24 is a sectional view on the line 24—24 of Fig. 1, but showing a slightly modified form of construction.

The invention is directed broadly to a machine for soldering the side seams of can bodies. The can bodies are delivered to the soldering means with their side seams lowermost, and are soldered by the soldering roll rotating in the solder bath. The can bodies are supported by parallel magnetic bars which are curved in cross section to conform to the cross section of the curved can body. The can bodies are slid along said bars by a traveling chain having pairs of lugs disposed at opposite ends of the can body. The forward lug is hook-shaped to insure that the forward end of the can body will be held in contact with the magnetic bars and not dislodged therefrom, while the other lug is merely a push lug engaging the rear end of the can body for sliding the same along said magnetic bars and said lug is shaped so that the can body may be readily stripped from the magnetic bars by pulling down on the rear end of the can body. The portion of the soldering machine leading to the soldering section is free from guiding rails of any kind so that a can body may be readily stripped from the machine if imperfect without stopping the machine. The can body is first presented to the soldering roll, moved along the soldering roll for soldering the seam, and is then conveyed to a wiper which wipes off the surplus solder, after which the can body is ejected from the machine.

The invention is particularly adapted for use in connection with a can body making machine such as disclosed in the application filed by Alfred L. Kronquest, August 9, 1921, Serial Number 490,895. In said machine, the can body moves continuously, while the side seam is being formed, and the side seam formed in the machine is of the lock and lap type. After the can body has been formed in the machine of the application referred to, it is then rotated to bring the side seam lowermost by mechanism which forms no part of the present invention, but which is shown, described and claimed in the application filed by Alfred L. Kronquest and Henry A. Fink, August 17, 1921, Serial Number 493,092.

In the region of the soldering bath of the present invention, there are guiding rails which insure that the can body will be held so that the side seam is located in proper position as it passes the soldering roll. The solder roll is formed with a spirally laid concave surface, and is so timed relative to the travel of the can body as to provide a traveling surface conforming in shape to the side seam in the can body, which seam curves downwardly between its ends as the metal is heated by the molten solder. In the wiping region, guides are provided for temporarily holding the can body in contact with the magnetic rail so as to insure that the wiper wiping off the surplus solder will not force the can body out of contact with the magnetic rails.

Referring more in detail to the drawings, the invention is shown as applied to a soldering machine which is especially adapted to be formed as a continuation of a body maker. In Fig. 2 of the drawings, the extreme rear end of the body maker is shown. The can bodies are formed about a horn 1 and preferably the side edges are formed into a lock and lap seam. When the can bodies reach the section 2, they are given a semi-rotation so as to bring the side seam which was uppermost during the forming of the body of the can to a lowermost position. As the can bodies reach the end 3 of the horn, they come in contact with a magnetic supporting means which supports the can bodies during the rest of their travel through the machine. The end of the horn 3 is supported by traveling supports 4 driven by means of a chain 6 from a shaft 7 which in turn is driven by an endless chain 8. The can bodies are conveyed along the horn and through the turning means by means of a traveling chain 9. Said traveling chain 9 is shown in detail in Figures 8 to 11, inclusive. Said chain consists of a series of pairs of links 10, 10 connected by suitable pintles 11. At certain distances throughout the extent of the conveying chain 9 there are blocks 12 arranged in pairs. One of said blocks is provided with a hook-shaped lug 13 and the other with a lug 14 having a straight surface. In Fig. 8 of the drawings, the can body is indicated at C and it will be noted that the hook-shaped lug 13 is in engagement with the forward end of the can body, the can body traveling in the direction of the arrow, while the straight lug 14 engages the rear end of the can body and merely slides the same along the magnetic supporting bars. When the can body passes slightly beyond the position shown in Fig. 8, the hooked lug 13 will partake of a curved path of travel and move out of engagement with the forward end of the can body, and as the can body leaves the magnetic bars, it will drop from the machine.

The soldering means for applying solder to the side seam includes a tank 15 (see Figures 1 and 7). Said tank 15 contains molten solder S which is kept in molten state by burners in the well known way. Said tank is preferably mounted on adjustable supports 16, 16 so that the tank may be raised and lowered if desired. Mounted in the tank is a soldering roll 17. Said soldering roll has a projecting stub shaft 18 mounted in a bearing 19 located within the tank. The other end of the soldering roll has a projecting shaft 20 which is mounted in a bearing 21 and this shaft 20 extends beyond the end of the tank where it is provided with a sprocket wheel 22 by means of which the soldering roll 17 is rotated. A sprocket chain 23 (see Fig. 1) runs over the sprocket wheel 22 and over a sprocket wheel 24 on a shaft 25, and the shaft 25 is provided with a bevel gear meshing with a bevel gear on the shaft 7 (see Fig. 2).

Just at the right of the tank 15 (see Fig. 1) is a wiping roll 26 which wipes the surplus solder off from the side seam. This wiping roll is mounted on a shaft 27 journaled in a bracket 28, and said wiping roll is driven by a suitable belt 29 from a belt wheel 30 mounted on a shaft 31 which is driven through suitable bevel gear connections with the shaft 25.

To the right of the wiping roll 26 is a cooling hood 32 (see Figures 1 and 3). This cooling hood 32 extends lengthwise of the machine and has an open slot at its upper end so that a draft of air may be directed on to the soldered seam as the can body passes along through the machine. Said hood 32 is mounted on brackets 33, 33, and is connected to a suitable blower 34 driven by a motor 35 or other suitable driving means.

The can body as above noted is supported by magnetic bars. These magnetic supporting bars extend from a point adjacent the horn to the rear end of the machine and therefore extend over the solder bath, the wiping roll, and the cooling hood. Said magnetic supporting bars are indicated at 36, 36. There is a magnetic supporting bar at each side of the machine and the surfaces 37 of the respective bars with which the can bodies C make contact are curved to conform to the outer surface of the can body.

The frame of the machine includes lower horizontal members 38 on which the solder bath is supported and likewise the cooling hood. Extending upwardly from these lower horizontal members are vertical frame members 39. On the vertical frame members are mounted angle bars 40, 40. Extending lengthwise of the machine is a non-magnetic bar 41. Said non-magnetic guide bar 41 is provided with projecting lugs 42 (see Figures 15, 16, 17 and 18). Bolts 43, 43 are threaded through the angle bars 40 and into these lugs 42, and these serve as a means whereby the guide bar 41 is supported by the frame. This guide bar 41 serves as a means for supporting and guiding the conveying chain which conveys the can bodies along the magnetic bars. Extending lengthwise of the machine are core plates 44. These core plates are cut away as at 45, 45, so as to provide cores which are close together and surrounding each core is a coil 46. These core plates are notched or recessed at 47 in the region of the projecting lugs 42 so as to extend down over said projecting lugs. The core plates are secured to the guide bar 41 by suitable bolts. The magnetic bars 36 are provided with notches or recesses 48 through which the lugs 42 pass and these magnetic bars overlie the lower ends of the core plates 44 and are secured thereto by suitable bolts 49 (see Fig. 5). Thus it is that the magnetic supporting bars 36 are rigidly secured and carried by the supporting frame of the machine.

The guide bar 41 is provided with a central recess 50 which is partially closed at its lower end, but leaving sufficient space for the lugs 13 and 14 to project down through and engage the can body. The lower surface of this guide bar 41 is curved and is disposed a slight distance above the path of travel of the can body. By shaping the recess 50 as described above, a complete housing is formed for the chain, the lower walls of the recess support the chain while it travels through the lower portion of the machine.

The core plates 44 are connected by means of a plate 51 which is bolted to the core plate by bolts 52. The chain on its return movement travels along and is supported by this connecting plate 51. The extreme right-hand end of the plate 51 is tapered off as indicated at 53 (see Fig. 8). The traveling chain 9 runs over a sprocket wheel 54 mounted on the shaft 55 which is journaled in bracket arms 56 connected to the end member 57 of the main frame by bolts 58 passing through slots in the bracket so that the bracket may be adjusted for tightening the chain.

At each side of the machine, and directly below the angle bars 40 are guide rails 59, 59. These guide rails are adjustably connected to the angle bars 40 by means of bolts 60, which bolts pass through slots 61 in the supporting members for the guide rails 59 (see Fig. 24). These guide rails serve to hold the can body with the side seam in proper position for taking the solder from the solder roll. The ends of these guide rails 59 are tapered so as to permit a can body to enter between the same and said guide rails round up the can body or possibly form it slightly into elliptical shape in cross section with the major diameter of the ellipse vertical. This, of course, tends to force the side seam downwardly. In the preferred form of the invention, and in order to prevent the can body from being forced downwardly too far, we have provided guide rails 62 shown in the modified form illustrated in Fig. 24. These guide rails are located at opposite sides of the machine and are secured to the machine by bolts 63 which pass through slots 64 formed in the supporting members for the guide rails. The inner portions of these rails are bent upwardly and the extreme inner ends are curved as indicated at 65 to conform to the curvature of the outer surface of the can body. Said guide rails are so positioned as to positively hold the side seam in just the right position relative to the solder roll so that the side seam will take the solder from the soldering roll, but without dipping too much into the solder.

The receiving ends of the guide rails 62 are likewise tapered to permit the entrance of the can therebetween. The solder roll as it rotates in the molten solder will take up a certain amount of solder and carry the same to the upper side of the roll, and as the side seam of the can is moved along in proper relation to the soldering roll, solder will be applied thereto.

The soldering roll as shown in the drawings is provided with a spirally laid thread 66. This spirally laid thread 66 forms recesses or grooves 67. The solder roll as clearly shown in the drawings has its ends tapered so that the can body is substantially free from contact with the solder roll until it is moved to a position entirely over the solder roll. The solder roll is also provided with a spirally laid concave portion, which concave portion extends substantially the length of a can body. The high parts of the roll are indicated by the dotted lines in Figures 21 and 22. It is well known that when the side seam of a can is heated, the metal expands more in the center than at the ends of the can, so that the side seam curves downwardly, and if the solder roll is straight, the solder will not be evenly applied to the seam. By making the roll concave spirally, and timing the roll to the travel of the can body forwardly, the concave portion of the roll will follow the can body. Said concave portion of the roll is of substantially the same curvature, as the heated side seam of the can body, and therefore said side seam will be equally spaced throughout its entire extent from the surface of the solder roll and the solder will be evenly distributed on said seam. This forms a surface in the soldering roll which not only conforms in shape to the side seam, but a surface which is interrupted. The purpose of this interrupted surface is to keep the solder from flowing up inside of the can body. As the seam moves along the solder roll, the solder at the rear end of the seam is inclined to roll up, follow the can body and flow inside thereof. By interrupting the surface, however, the solder will drain off from the can body and thus flowing of the solder inside of the can in the manner stated is avoided. The soldering roll per se forms no part of the present invention, but is the sole invention of Alfred L. Kronquest, one of the joint inventors hereto.

In the region of the wiping roll 26 there are guide rails 68, 68 which have their ends tapered as indicated at 69 so as to facilitate the easy passage of the can body between said guide rails. These guide rails are adjustably secured to the angle bars 40 by means of bolts 70 which pass through the angle bars and through slots 71 in the respective guide rails 68. As a can body passes through the wiping region and when the wiping roll or brush makes contact with the side seam for brushing off the surplus solder, these guide rails 68, 68 positively hold the can body in contact with the magnetic supporting bars and prevents the can body from being dislodged therefrom. The coils for magnetizing the magnetic supporting bars are arranged in pairs and are so energized that one of the magnetic bars is positive while the other is negative. In Fig. 20 we have shown a suitable wiring diagram wherein G is the generator which is connected by a suitable switch 72 to the lines 73 and 74. The line 73 is connected to the coils 46' along one side of the machine. The coils are connected in series and the line is connected to the left-hand end of the series. The line 74 is connected to the other end of this series of coils. The series of coils 46'' on the other side of the machine are also connected in series, and the right-hand end of said series is connected by a wire 75 with the wire 73 at the end thereof which is connected with the first coil of the series 46'. The wire 74 is connected to the left-hand end of the series of coils 46''. The result is that the two series of coils 46' and 46'' are connected in multiple, but the current flows in one direction through the series 46' while it flows in the other direction through the series 46'', and thus it is that one of the magnetic bars is positive while the other is negative and the can body serves as an armature connecting these opposite poles of the coil magnets.

It will be noted that the guide bars in the region of the soldering means do not extend to any distance beyond the left of the tank, and therefore, there is a free space between the end of the horn of the body maker and the soldering means where the sole support and guide for the can body are the magnetic bars and conveying chain. If the can body passing from the body maker is imperfect, the operator inspecting the can bodies may readily pull down on the rear end of the can body which is engaged solely by the pushing lug, and strip the can body from the magnetic bars, thus removing the can body from the machine. While the can body is passing through the soldering region, it is not only supported by the magnetic bars, but there are cooperating guiding rails which tend to properly shape the can body so as to positively position the side seam for soldering contact with the soldering roll. Also in the region of the wiping of the seam, there are guide rails associated with the magnetic bars which prevent the can body from being dislodged from the magnetic bars through the action of the wiping roll upon the can body. At the rear end of the machine, the magnetic bars cease, and the conveying lugs travel in a path to release the can body so that it is positively ejected from the machine by the pushing lug.

While we have shown the magnetic supporting bars and traveling devices associated therewith as supporting and conveying the can body to a soldering mechanism, which includes a soldering roll rotating in a soldering bath, it will be understood that the soldering mechanism may be changed as to construction, the essential features consisting in the magnetic supporting and conveying means for handling the can body.

It is obvious that minor changes in the details of construction and the arrangement of the parts may be made without departing from the spirit of the invention as set forth in the appended claims.

Having thus described the invention, what we claim as new and desire to secure by Letters-Patent, is—

1. The combination of a magnetic support along which can bodies may be moved, means located above the can bodies for sliding the can bodies along said support, a solder bath located beneath the can bodies, and means whereby the solder is applied to the side seams of the can bodies as they move along the support, said can bodies being freely carried by the magnetic support during a portion of their travel along the same and prior to passing over the solder bath whereby an imperfect can body can be stripped from the support by a downward pull thereon.

2. The combination of a magnetic support along which can bodies may be moved, means located above the can bodies for sliding the can bodies along said support, a solder bath beneath the can bodies, a solder roll located in said bath and arranged with its axis parallel with the magnetic support and disposed so as to supply the side seams of the can bodies with solder as they move along the magnetic support, said can bodies being freely carried by the magnetic support during a portion of their travel along the same and prior to passing over the solder bath whereby an imperfect can body can be stripped from the support by a downward pull thereon.

3. The combination of spaced magnetic supports along which can bodies may be moved, a traveling chain located between said supports and above the can bodies, said chain having lugs for engaging the can bodies and sliding the same along said magnetic supports, and soldering means located beneath the can bodies for applying solder to the seams of the can bodies as they move along the magnetic supports, said can bodies being freely carried by the magnetic support during a portion of their travel along the same and prior to passing over the solder bath whereby an imperfect can body can be stripped from the support by a downward pull thereon.

4. The combination of spaced magnetic supports along which can bodies may be moved, a traveling chain located between said supports and above the can bodies, said chains having lugs for engaging the can bodies and sliding the same along said magnetic supports, a solder bath located beneath the magnetic supports, and a soldering roll located in said bath and extending longitudinally of the magnetic supports for engaging the side seams of the can bodies for applying solder thereto, said can bodies being freely carried by the magnetic support during a portion of their travel along the same and prior to passing over the solder bath whereby an imperfect can body can be stripped from the support by a downward pull thereon.

5. The combination of spaced magnetic supports along which can bodies may be moved, a traveling chain located between said supports and having lugs for engaging the can bodies and sliding the same along said magnetic supports, a solder bath located beneath the magnetic supports, a soldering roll located in said bath and extending longitudinally of the magnetic supports for engaging the side seams of the can bodies for applying solder thereto, and guide bars in the region of the solder bath only for engaging the outside of the can body for positively holding said can body in proper soldering relation to the soldering roll, said can bodies being freely carried by the magnetic support during a portion of their travel along the same and prior to passing over the solder bath whereby an imperfect can body can be stripped from the support by a downward pull thereon.

6. The combination of a magnetic support along which can bodies may be moved, means for sliding the can bodies along said support, a solder bath, a solder roll located in said bath and arranged with its axis parallel with the magnetic support and disposed so as to supply the side seams of the can bodies with solder as they move along the magnetic support, and guide bars located adjacent the solder bath only for engaging the outer surface of the can bodies for positively holding the side seams in proper soldering relation to the solder roll, said can bodies being freely carried by the magnetic support during a portion of their travel along the same and prior to passing over the solder bath whereby an imperfect can body can be stripped from the support by a downward pull thereon.

7. The combination of spaced magnetic supports along which the can bodies may be moved, a non-magnetic guide bar located above the can bodies and having a longitudinal recess therein, a conveying chain adapted to travel in the recess in the guide bar, lugs carried by said conveying chain and projecting below said guide bar for engaging the can bodies and moving the same along the magnetic support, and soldering means for applying solder to the can bodies as they move along said magnetic supports, said can bodies being freely carried by the magnetic support during a portion of their travel along the same and prior to passing over the solder bath whereby an imperfect can body can be stripped from the support by a downward pull thereon.

8. The combination with soldering means for applying solder to the side seam of a can body; of means for presenting the can bodies to the soldering means including parallel magnetic bars having pole faces curved to conform to the outer face of the can body and along which the can body may be slid, said pole faces being both located at the same side of a plane parallel with said faces and passing centrally through the can body, magnetizing coils associated with the magnetic bars for magnetizing the same, and means for sliding the can bodies along the magnetic bars, said can bodies being freely carried by the magnetic support during a portion of their travel along the same and prior to passing over the solder bath whereby an imperfect can body can be stripped from the support by a downward pull thereon.

9. The combination with soldering means for applying solder to the side seam of a can body; of means for presenting the can bodies to the soldering means including spaced magnetic bars extending lengthwise of the machine for supporting the can bodies and along which they may be slid in an endwise direction, said magnetic bars operating to freely support the can bodies during a portion of their travel and prior to the presenting of the can body to the soldering means whereby said can bodies may be stripped from the magnetic support, if imperfect, core plates attached to said bars and having spaced cores around each of which is a coil, a plate connecting the upper ends of said core plates, means for magnetizing the coils whereby one of said bars is positive and the other negative, and means for sliding the can bodies along the bars.

10. The combination with soldering means for applying solder to the side seam of a can body; of means for presenting the can bodies to the soldering means including spaced magnetic bars extending lengthwise of the machine for supporting the can bodies and along which they may be slid in an endwise direction, said magnetic bars operating to freely support the can bodies during a portion of their travel and prior to the presenting of the can body to the soldering means whereby said can bodies may be stripped from the magnetic support, if imperfect, core plates attached to said bars and having spaced cores around each of which is a coil, a plate connecting the upper ends of said core plates, means for magnetizing the coils whereby one of said bars is positive and the other negative, and means for sliding the can bodies along the bars, said bars having their pole faces curved to conform to the outer face of the can body.

11. The combination with soldering means for applying solder to the side seam of a can body; of means for presenting the can bodies to the soldering means including spaced magnetic bars extending lengthwise of the machine for supporting the can bodies and along which they may be slid in an endwise direction, said magnetic bars operating to freely support the can bodies during a portion of their travel and prior to the presenting of the can body to the soldering means whereby said can bodies may be stripped from the magnetic support, if imperfect, core plates attached to said bars and having spaced cores around each of which is a coil, a plate connecting the upper ends of said core plates, means for magnetizing the coils whereby one of said bars is positive and the other negative, and means for sliding the can bodies along the bars, said bars having their pole faces curved to conform to the outer face of the can body, and guide bars located in the region of the soldering means only for engaging the outer surface of the can body for positively shaping the can body and holding the same in contact with the magnetic bars while solder is being applied to the side seams.

12. The combination with soldering means, said soldering means being located below the path of travel of the can bodies for applying solder to the side seam of a can body; of means for presenting the can bodies to the soldering means including spaced magnetic bars above the path of travel of said can bodies and supporting the same, coils associated with said bars for magnetizing the same, a non-magnetic guide bar having a longitudinal recess therein, and a conveying chain sliding in said recess and having projecting lugs adapted to engage the can bodies and move the same in an endwise direction along the magnetic bars, said magnetic bars freely supporting the can bodies during a portion of the travel thereof prior to passing the soldering means whereby imperfect can bodies may be stripped from the magnetic bars.

13. The combination with soldering means for applying solder to the side seam of a can body; of means for presenting the can bodies to the soldering means including spaced magnetic bars, coils associated with said bars for magnetizing the same, a non-magnetic guide bar having a longitudinal recess therein, a conveying chain sliding in said recess and having projecting lugs adapted to engage the can bodies and move the same along the magnetic bars, one of said lugs being at the forward end of the can body and having a hook-shaped end extending within the can body for insuring the forward end remaining in contact with the magnetic bars, and the other lug being at the rear end of the can body and having a vertical face for engaging the end of the can body for moving the same along the magnetic bars.

14. The combination with soldering means for applying solder to the side seam of a can body; of means for presenting the can bodies to the soldering means including spaced magnetic bars, coils associated with said bars for magnetizing the same, a non-magnetic guide bar having a longitudinal recess therein, a conveying chain sliding in said recess and having projecting lugs adapted to engage the can bodies and move the same along the magnetic bars, one of said lugs being at the forward end of the can body and having a hook-shaped end extending within the can body for insuring the forward end remaining in contact with the magnetic bars, and the other lug being at the rear end of the can body and having a vertical face for engaging the end of the can body for moving the same along the magnetic bars, guide bars associated with the soldering means for properly holding the can body while it is being soldered, said guide bars terminating at the end of the soldering means whereby the machine is free from guide bars in the region through which the can body passes as it enters the soldering means whereby an imperfect can body may be readily stripped from the supporting and conveying means.

15. The combination with soldering means for applying solder to the side seam of a can body; of means for presenting can bodies to the soldering means including magnetic bars for supporting the can bodies and along which they may slide, a conveying chain for moving the can bodies along said magnetic bars, said conveying chain having spaced lugs, one of said lugs being at the forward end of the can body and being hook-shaped so as to extend into the can body and hold the forward end of the can body in contact with the magnetic bars, the other lug being at the rear end of the can body and having a vertical face for engaging the end of the can to push the same along the magnetic bars.

16. The combination with soldering means for applying solder to the side seam of a can body; of means for presenting can bodies to the soldering means including magnetic bars for supporting the can bodies and along which they may slide, a conveying chain for moving the can bodies along said magnetic bars, said conveying chain having spaced lugs, one of said lugs being at the forward end of the can body and being hook-shaped so as to extend into the can body and hold the forward end of the can body in contact with the magnetic bars, the other lug being at the rear end of the can body and having a vertical face for engaging the end of the can to push the same along the magnetic bars, guide bars disposed in the region of the soldering means for properly shaping the can body for presentation to the soldering means, said guide bars terminating at the end of the soldering means whereby the magnetic bars in the region leading to the soldering means are the sole support for the can bodies whereby an imperfect can body may be readily removed from the machine.

17. The combination of a solder bath, a solder roll rotating in said bath and extending lengthwise thereof, magnetic bars extending lengthwise of said roll, said magnetic bars having pole faces curved to conform to the can body for supporting can bodies and along which pole faces the can bodies may slide, a conveyor for sliding the can bodies along the magnetic bars, spaced guide bars extending the length of the soldering roll only for engaging the can bodies as they pass over the soldering roll above the horizontal diameter of the can bodies for shaping the can body to properly present the side seam to the solder roll.

18. The combination of a solder bath, a solder roll rotating in said bath and extending lengthwise thereof, magnetic bars extending lengthwise of said roll, said magnetic bars having pole faces curved to conform to the can body for supporting can bodies and along which pole faces the can bodies may slide, a conveyor for sliding the can bodies along the magnetic bars, spaced guide bars for engaging the can bodies as they pass over the soldering roll above the horizontal diameter of the can bodies for shaping the can body to properly present the side seam to the solder roll, and spaced guide bars engaging the upper surface of the can bodies below the horizontal diameter thereof for insuring the proper position of the side seam relative to the soldering roll said guide bar extending only the length of the soldering roll.

19. The combination with soldering means including a solder bath and a solder roll, solder wiping means including a rotating solder wiping member, and cooling means; said solder roll, said wiping means, and said cooling means all being located beneath the path of travel of the can bodies, of magnetic bars extending lengthwise of the machine and over the solder bath, the wiping member and the cooling means, and means for moving can bodies along said magnetic bars, said can bodies being freely carried by the magnetic bars during a portion of their travel along the same and prior to passing over the solder bath, whereby an imperfect can body can be stripped from the bars by a downward pull thereon.

20. The combination with soldering means including a solder bath and a solder roll, solder wiping means including a rotating solder wiping member, and cooling means; said solder roll, said wiping means and said cooling means all being located beneath the path of travel of the can bodies, of spaced magnetic bars extending over the solder bath, the wiping member and the cooling means, a non-magnetic bar having a recess therein, a conveying chain adapted to travel through the said recess and having projecting lugs engaging the can bodies and moving the same along the magnetic bars, said can bodies being freely carried by the magnetic bars during a portion of their travel along the same and prior to passing over the solder bath, whereby an imperfect can body can be stripped from the support by a downward pull thereon.

21. The combination with soldering means including a solder bath and a solder roll, solder wiping means including a rotating solder wiping member, and cooling means; of spaced magnetic bars extending over the solder bath, the wiping member and the cooling means, a non-magnetic bar having a recess therein, a conveying chain adapted to travel through the said recess and having projecting lugs engaging the can bodies and moving the same along the magnetic bars, core plates extending longitudinally of the machine and to which said magnetic bars are connected, said core plates having spaced cores around which coils are placed, and a connecting plate at the upper end of said core plates on which said conveying chain is supported on its return movement.

22. The combination with soldering means including a solder bath and a solder roll, solder wiping means including a rotating solder wiping member, and cooling means; of spaced magnetic bars extending over the solder bath, the wiping member and the cooling means, a non-magnetic bar having a recess therein, a conveying chain adapted to travel through the said recess and having projecting lugs engaging the can bodies and moving the same along the magnetic bars, core plates extending longitudinally of the machine and to which said magnetic bars are connected, said core plates having spaced cores around which coils are placed, a connecting plate at the upper end of said core plates on which said conveying chain is supported on its return movement, and means for energizing said coils whereby one of said magnetic bars is positive and the other is negative.

23. The combination with soldering means including a solder bath and a solder roll, solder wiping means including a rotating solder wiping member, and cooling means; of spaced magnetic bars extending over the solder bath, the wiping member and the cooling means, a non-magnetic bar having a recess therein, a conveying chain adapted to travel through the said recess and having projecting lugs engaging the can bodies and moving the same along the magnetic bars, core plates extending longitudinally of the machine and to which said magnetic bars are connected, said core plates having spaced cores around which coils are placed, a connecting plate at the upper end of said core plates on which said conveying chain is supported on its return movement, spaced guide bars for engaging the outer face of the can body for holding the same in proper position for presentation to the solder roll, and spaced guide bars between which the can body travels while the same is being wiped for preventing the can body from being dislodged from the magnetic bars by the wiping member.

In testimony whereof, we affix our signatures.

FRANK A. ASSMANN, Jr.,
ALFRED L. KRONQUEST.